(12) United States Patent
Ohno et al.

(10) Patent No.: US 9,115,000 B2
(45) Date of Patent: Aug. 25, 2015

(54) PROCESS FOR PRODUCING CARBONYL SULFIDE

(75) Inventors: Hiromoto Ohno, Minato-ku (JP); Hidejiro Yokoo, Minato-ku (JP); Shiho Irie, Minato-ku (JP)

(73) Assignee: SHOWA DENKO K.K., Tokyo (JP)

(*) Notice: Subject to any disclaimer, the term of this patent is extended or adjusted under 35 U.S.C. 154(b) by 28 days.

(21) Appl. No.: 14/112,477

(22) PCT Filed: Apr. 13, 2012

(86) PCT No.: PCT/JP2012/060163
§ 371 (c)(1),
(2), (4) Date: Oct. 17, 2013

(87) PCT Pub. No.: WO2012/144441
PCT Pub. Date: Oct. 26, 2012

(65) Prior Publication Data
US 2014/0044638 A1    Feb. 13, 2014

(30) Foreign Application Priority Data
Apr. 18, 2011   (JP) ................. 2011-092435

(51) Int. Cl.
*C01B 31/26*    (2006.01)
(52) U.S. Cl.
CPC ..................... *C01B 31/26* (2013.01)
(58) Field of Classification Search
CPC ........................................... C01B 31/26
USPC ....................... 423/416–418, 418.2
See application file for complete search history.

(56) References Cited

U.S. PATENT DOCUMENTS

| | | | |
|---|---|---|---|
| 2,992,896 A | 7/1961 | Applegath et al. | |
| 2,992,897 A | 7/1961 | Applegath et al. | |
| 2,992,898 A | 7/1961 | Applegath et al. | |
| 3,235,333 A * | 2/1966 | Swakon et al. | 423/416 |
| 3,409,399 A | 11/1968 | Bertozzi et al. | |
| 4,078,045 A | 3/1978 | Nakayama et al. | |
| 4,120,944 A | 10/1978 | Kubicek | |
| 4,224,300 A | 9/1980 | Takahashi et al. | |

FOREIGN PATENT DOCUMENTS

| | | |
|---|---|---|
| CN | 101289186 A | 10/2008 |
| CN | 101489930 A | 7/2009 |
| GB | 1110415 | 4/1968 |
| GB | 2057412 A | 8/1980 |
| JP | 47-27634 B1 | 7/1972 |

(Continued)

*Primary Examiner* — Daniel C McCracken
(74) *Attorney, Agent, or Firm* — Sughrue Mion, PLLC

(57) ABSTRACT

An efficient process is provided in which sulfur is reacted with carbon monoxide in a liquid phase to produce carbonyl sulfide. In the presence of a base catalyst, carbon monoxide is continuously introduced into a reactor in which a liquid reaction mixture obtained by dissolving or suspending sulfur in an organic solvent is held, and the sulfur is reacted with the carbon monoxide at a pressure of 0.2-3.0 MPa and a temperature of 40-120° C. to yield carbonyl sulfide. The gaseous-phase part is withdrawn from the reactor, and the withdrawn gaseous-phase part is cooled with a cooler to condense the carbonyl sulfide contained in the gaseous-phase part. The condensed carbonyl sulfide is continuously withdrawn, and the gas that has not been condensed with the cooler is returned to the reactor. Thus, carbonyl sulfide is continuously produced.

2 Claims, 1 Drawing Sheet

(56) References Cited

FOREIGN PATENT DOCUMENTS

| JP | 47-40632 B1 | 10/1972 |
|----|----|----|
| JP | 52-131993 A | 11/1977 |
| JP | 56-59613 A | 5/1981 |
| JP | 56-59614 A | 5/1981 |
| JP | 56-45847 B2 | 10/1981 |
| JP | 61-5409 B2 | 2/1986 |
| JP | 61-197414 A | 9/1986 |
| WO | 2004/089824 A1 | 10/2004 |
| WO | 2008/003732 A1 | 1/2008 |

* cited by examiner

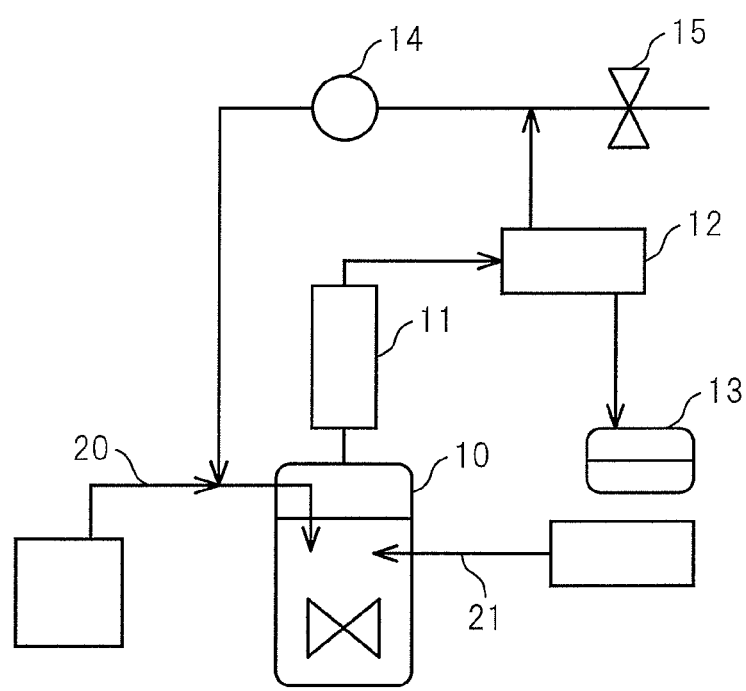

PROCESS FOR PRODUCING CARBONYL SULFIDE

CROSS REFERENCE TO RELATED APPLICATIONS

This is a National Stage of International Application No. PCT/JP2012/060163 filed Apr. 13, 2012 (claiming priority based on Japanese Patent Application No. 2011-092435 filed Apr. 18, 2011), the contents of which are incorporated herein by reference in their entirety.

TECHNICAL FIELD

The present invention relates to a process for producing carbonyl sulfide. In particular, the present invention relates to a process of reacting sulfur with carbon monoxide in a liquid phase to produce carbonyl sulfide.

BACKGROUND ART

Carbonyl sulfide is an important compound which is attracting attention as an etching gas for highly anisotropical and highly selective etching of an organic antireflective coating by plasma. Conventionally, a process of reacting carbon dioxide with carbon disulfide and a process of reacting sulfur with carbon monoxide have been known as a process for producing carbonyl sulfide.

For example, U.S. Pat. No. 4,120,944 (Patent Document 1), U.S. Pat. No. 3,409,399 (Patent Document 2), and Japanese Examined Patent Publication No. S47-40632 (Patent Document 3) describe a process of reacting carbon dioxide with carbon disulfide in a gas phase in the presence of a catalyst. Such process, however, suffers from reduced activity of the catalyst. Known examples of the process of reacting sulfur with carbon monoxide to produce carbonyl sulfide include a process of conducting the reaction in a gas phase and a process of conducting the reaction in a liquid phase. As examples of the process of conducting the reaction in a gas phase, Japanese Examined Patent Publication No. S56-45847 (Patent Document 4) and Japanese Examined Patent Publication No. S61-5409 (Patent Document 5), for example, describe a process of reacting sulfur with carbon monoxide in the presence or absence of a catalyst. In such process, the sulfur used in excess is required to be separated, and there is fear of the formed carbonyl sulfide decomposing because of high temperature. The process which uses no catalyst requires a very high reaction temperature and thus requires use of an expensive corrosion-resistant material.

Known examples of the process of reacting sulfur with carbon monoxide in a liquid phase to produce carbonyl sulfide are described in the following patent documents.

(1) U.S. Pat. No. 2,992,896 (Patent Document 6) describes a process for producing carbonyl sulfide, the process including suspending an aliphatic tertiary amine and hydrogen sulfide in an aliphatic alcohol solvent and reacting sulfur with carbon monoxide in the suspension.

(2) U.S. Pat. No. 2,992,897 (Patent Document 7) describes a process for producing carbonyl sulfide, the process including reacting sulfur with carbon monoxide in an aliphatic alcohol solvent having dispersed therein a sulfide or a bisulfide of an alkali metal or an alkaline earth metal as a catalyst.

(3) U.S. Pat. No. 2,992,898 (Patent Document 8) describes a process for producing carbonyl sulfide, the process including reacting sulfur with carbon monoxide in a medium of a hydroxy substituted tertiary aliphatic amine.

(4) U.S. Pat. No. 3,235,333 (Patent Document 9) describes a process for producing carbonyl sulfide, the process including reacting sulfur with carbon monoxide in the presence of an alkali metal carboxylate, an alkali metal formate, an alkali metal acetate, an alkoxide of a metal of Group I, II, and III, tetramethylguanidine, or potassium formate as a catalyst at a temperature of from 50° C. to 150° C. and a carbon monoxide pressure of from 200 psig (1.38 MPa) to 5000 psig (34.4 MPa).

(5) Japanese Unexamined Patent Publication No. 561-197414 (Patent Document 10) describes a process for continuously producing carbonyl sulfide, the process including reacting a secondary aliphatic amine with carbon monoxide and sulfur using selenium (Se) as a catalyst to form a thiocarbamic acid amine salt, thermally decomposing the formed thiocarbamic acid amine salt into carbonyl sulfide and a secondary amine, and reacting the secondary amine with carbon monoxide and sulfur.

(6) International Patent Application Publication No. WO2004/089824 (Patent Document 11) describes a process for producing carbonyl sulfide, the process including dissolving sulfur in carbon disulfide and reacting it with carbon monoxide.

CITATION LIST

Patent Documents

Patent Document 1: U.S. Pat. No. 4,120,944
Patent Document 2: U.S. Pat. No. 3,409,399
Patent Document 3: Japanese Examined Patent Publication No. S47-40632
Patent Document 4: Japanese Examined Patent Publication No. S56-45847
Patent Document 5: Japanese Examined Patent Publication No. S61-5409
Patent Document 6: U.S. Pat. No. 2,992,896
Patent Document 7: U.S. Pat. No. 2,992,897
Patent Document 8: U.S. Pat. No. 2,992,898
Patent Document 9: U.S. Pat. No. 3,235,333
Patent Document 10: Japanese Unexamined Patent Publication No. S61-197414
Patent Document 11: International Patent Application Publication No. WO2004/089824

SUMMARY OF INVENTION

Technical Problem

The process for producing carbonyl sulfide according to the above (1)-(6) has room for improvement as described below.

Although the process according to (1), (2), or (3) produces carbonyl sulfide in a liquid phase from sulfur and carbon monoxide even at a relatively low temperature, selectivity and quality are not described. Because the process according to (1) or (2) uses an aliphatic alcohol or a glycol as a solvent, the formation of by-products cannot be avoided.

The process according to (4), the process including reacting sulfur with carbon monoxide in the presence of a catalytic amount of alkali at a relatively low temperature, desirably in the range of from 80° C. to 150° C., requires a relatively high pressure, as Patent Document 9 discloses, the reaction is conducted at a carbon monoxide pressure of 1.38 MPa (200 psig) or more and desirably 3.44 MPa (500 psig) or more. Most of the Examples in Patent Document 9 use methanol as the solvent, and thus methanol seems to be the optimal solvent. The formed carbonyl sulfide, however, can react under alkaline conditions and thus includes by-products.

The process according to (5) is a two step reaction in which first, a thiocarbamic acid amine salt is produced from carbon monoxide, sulfur, and 2 equivalents of a secondary amine and then the thiocarbamic acid amine salt is thermally decomposed. In addition, the process requires use of highly toxic selenium, and thus the process is not beneficial for industrial production.

The process according to (6) is based on the fact that sulfur dissolved in carbon disulfide reacts with carbon monoxide to produce carbonyl sulfide, although the reaction conditions and the presence or absence of a catalyst are not described.

Patent Document 9 discloses a process for producing carbonyl sulfide from carbon monoxide and sulfur, the process including reacting carbon monoxide with sulfur in an organic solvent in the presence of a suitable basic material as a catalyst at a carbon monoxide pressure of from 1.378 MPa to 34.45 MPa and a temperature of from 50° C. to 150° C. When sulfur is reacted with pressurized carbon monoxide in an organic solvent in the presence of a catalyst, the pressure of the formed carbonyl sulfide increases as the reaction proceeds. Because of the necessity to keep the pressure of the carbon monoxide high, the pressure of the overall reaction system is quite high. When a reactor is charged with an excess of sulfur and pressurized with carbon monoxide to conduct the reaction as a batch reaction, the reactor pressure drops and the reaction rate approaches zero as the reaction proceeds. Finally, when the pressure reaches the pressure of the formed carbonyl sulfide, the reaction is halted. Then additional carbon monoxide is charged to induce the reaction. When the carbon monoxide is consumed, the pressure of the carbonyl sulfide becomes higher. Thus, the reaction at or below a certain pressure limits the yield in a batch. In the batch reaction, the carbon monoxide pressure is low for a relatively long period of time, and the production rate per reactor volume is low. In contrast, the pressure of the reaction system is extremely high in continuous production, because the carbonyl sulfide dissolved in the gas phase and the reaction solvent is also considered to keep the pressure of the carbon monoxide in the gas phase of the reactor high in the steady state.

The present invention is directed to solve the problems with related art as described above and to provide a process for efficiently and conveniently producing carbonyl sulfide (COS) at low cost.

Solution to Problem

As a result of assiduous research intended to produce high purity carbonyl sulfide by reaction at a lower temperature and a lower pressure in consideration of selectivity, thermal stability, and economy, it has been found that carbonyl sulfide can be produced at a high production rate by continuously adding carbon monoxide into a reactor which contains sulfur dissolved or suspended in an organic solvent in the presence of a base catalyst; reacting the sulfur with the carbon monoxide at a pressure of 0.2-3.0 MPa and a temperature of 40-120° C. to form carbonyl sulfide; recovering a gas phase from the reactor; cooling the recovered gas phase using a condenser to condense the carbonyl sulfide in the gas phase; continuously recovering the condensed carbonyl sulfide; and returning the uncondensed gas to the reactor, thereby completing the present invention.

Following are the aspects of the present invention:

[1] A process for producing carbonyl sulfide, the process including continuously adding carbon monoxide into a reactor which contains sulfur dissolved or suspended in an organic solvent in the presence of a base catalyst; reacting the sulfur with the carbon monoxide at a pressure of 0.2-3.0 MPa and a temperature of 40-120° C. to form carbonyl sulfide; recovering a gas phase from the reactor; cooling the recovered gas phase using a condenser to condense the carbonyl sulfide in the gas phase; continuously recovering the condensed carbonyl sulfide; and returning the uncondensed gas to the reactor to continuously produce carbonyl sulfide.

[2] The process for producing carbonyl sulfide according to [1], the process further including continuously adding sulfur into the reactor.

[3] The process for producing carbonyl sulfide according to [1] or [2], wherein the base catalyst is a basic organic compound selected from the group consisting of amidine bases, guanidine bases, and phosphazene bases.

[4] The process for producing carbonyl sulfide according to [3], wherein the amidine bases are selected from the group consisting of 1,8-diazabicyclo[5.4.0]undec-7-ene and 1,5-diazabicyclo[4.3.0]non-5-ene, the guanidine bases are selected from the group consisting of 1,5,7-triazabicyclo[4.4.0]dec-5-ene, 7-methyl-1,5,7-triazabicyclo[4.4.0]dec-5-ene, and 1,1,3,3-tetramethylguanidine, and the phosphazene bases are selected from the group consisting of alkylimino-tris(dimethylamino)phosphorane in which the alkyl is a $C_{1-8}$ alkyl group and alkylimino-tris(pyrrolidino)phosphorane in which the alkyl is a $C_{1-8}$ alkyl group.

Advantageous Effects of Invention

The production process of the present invention can efficiently and conveniently produce a high purity carbonyl sulfide (COS) at low cost.

BRIEF DESCRIPTION OF DRAWING

FIG. 1 is a flow chart illustrating an embodiment of the process of the present invention.

DESCRIPTION OF EMBODIMENTS

The present invention relates to a process for producing carbonyl sulfide, the process including continuously adding carbon monoxide into a reactor which contains sulfur dissolved or suspended in an organic solvent in the presence of a base catalyst; reacting the sulfur with the carbon monoxide at a pressure of 0.2-3.0 MPa and a temperature of 40-120° C. to form carbonyl sulfide; recovering the gas phase from the reactor; cooling the recovered gas phase using a condenser to condense the carbonyl sulfide in the gas phase; continuously recovering the condensed carbonyl sulfide; and returning the uncondensed gas to the reactor to continuously produce carbonyl sulfide.

In the process of the present invention, the reaction pressure is 0.2-3.0 MPa. According to the present invention, the pressure of the reaction system is 3 MPa or less in the steady state in the continuous reaction, although the pressure may be 1 MPa or less. Desirably, the carbon monoxide pressure is kept at about 30% of the system pressure. Thus the carbon monoxide pressure of 0.3 MPa or less allows for a sufficiently high production rate.

In the process of the present invention, the reaction temperature is 40-120° C. The reaction temperature is at least 40° C. and usually in the range of from 60° C. to 100° C.

Examples of the base catalyst which can be used in the process of the present invention include basic organic compounds such as amidine bases, guanidine bases, phosphazene bases, quaternary ammonium hydroxides substituted with an alkyl group or an aralkyl group, aliphatic cyclic tertiary amines, aliphatic tertiary amines, aliphatic cyclic secondary amines, and aliphatic secondary amines. The amidine bases, the guanidine bases, and the phosphazene bases are preferred.

The amidine bases refer to a basic organic compound having an amidine backbone. As used herein, the amidine backbone refers to a structure represented by the Formula (1).

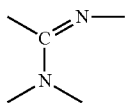

(1)

Specific examples of the amidine bases include 1,8-diazabicyclo[5.4.0]undec-7-ene (DBU) and 1,5-diazabicyclo[4.3.0]non-5-ene (DBN).

The guanidine bases refer to a basic organic compound having a guanidine backbone. As used herein, the guanidine backbone refers to a structure represented by the Formula (2).

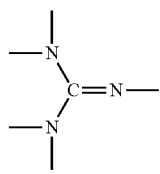

(2)

The guanidine bases are described in Ullmann's Encyclopedia of Industrial Chemistry, Sixth, Completely Revised Ed., vol. 16, p. 81. Specific examples of the guanidine bases include 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG).

The phosphazene bases refer to a basic organic compound having a phosphazene backbone. As used herein, the phosphazene backbone refers to a structure represented by the Formula (3).

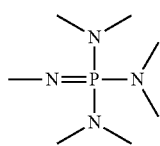

(3)

The phosphazene bases are described in, for example, Journal of Organic Chemistry, 2002, vol. 67, p. 1873-1881. Specific examples of the phosphazene bases include alkyliminotris(dimethylamino)phosphorane in which the alkyl is a $C_{1-8}$ alkyl group and alkylimino-tris(pyrrolidino)phosphorane in which the alkyl is a $C_{1-8}$ alkyl group.

Preferably, the alkyl group of the quaternary ammonium hydroxides substituted with an alkyl group or an aralkyl group is a $C_{1-4}$ alkyl group. Specific examples of such alkyl group include methyl, ethyl, normal propyl, and normal butyl.

Preferably, the aralkyl group of the quaternary ammonium hydroxides substituted with an alkyl group or an aralkyl group is a $C_{7-10}$ aralkyl group. Specific examples of such aralkyl group include benzyl and paramethylbenzyl.

Specific examples of the quaternary ammonium hydroxides substituted with an alkyl group or an aralkyl group include tetramethyl ammonium hydroxide, benzyltrimethyl ammonium hydroxide, and tetrabutyl ammonium hydroxide.

An example of the aliphatic cyclic tertiary amines includes 1,4-diazabicyclo[2.2.2]octane.

Examples of the aliphatic tertiary amines include triethylamine, tri-n-propylamine, and tri-n-butylamine.

Examples of the aliphatic cyclic secondary amines include pyrrolidine, piperazine, piperidine, and morpholine.

Examples of the aliphatic secondary amines include di-n-propylamine, diethylamine, and di-n-butylamine.

Among the basic organic compounds, the amidine bases, the guanidine bases, and the phosphazene bases are preferred.

Examples of the organic solvent which can be suitably used in the process of the present invention include aromatic hydrocarbons such as toluene and xylene; saturated aliphatic hydrocarbons such as hexane and octane; aprotic polar solvents such as DMF, acetonitrile, and N-methylpyrrolidone; ethers such as diethylether, tetrahydrofuran, and anisole; esters such as ethyl acetate and butyl acetate. Alcohols such as methanol are also suitable as the organic solvent. Ketones and aliphatic chlorinated solvents are undesirable in that they might be, for example, degraded or condensed with the base catalyst. Water-containing organic solvents and carboxylic acids are also undesirable in that they might react with the formed carbonyl sulfide to produce impurities.

The concentration of the base catalyst in the organic solvent is preferably 0.005-2.0 mol/L and more preferably 0.02-1 mol/L.

FIG. 1 is a flow chart illustrating an embodiment of the process of the present invention. The reactor 10 is, for example, a stirred reactor. The reactor 10 contains sulfur dissolved or suspended in an organic solvent. The solution or suspension includes the base catalyst. The solution or suspension also includes dissolved carbon monoxide. Carbon monoxide and sulfur are fed into the reactor 10 from the carbon monoxide feed line 20 and the sulfur feed line 21, respectively. The gas phase above the solution or suspension in the reactor 10 includes carbon monoxide as feedstock, the formed carbonyl sulfide, and vapor of the organic solvent. The gas phase is fed into the reflux condenser 11. The organic solvent is condensed in the reflux condenser 11 and then returned to the reactor. The gas phase after passing through the reflux condenser 11 is fed into the condenser 12. In the condenser 12, the carbonyl sulfide is condensed, and the condensed carbonyl sulfide is fed into the tank 13. The uncondensed gas, which is mainly carbon monoxide and carbonyl sulfide, in the condenser 12 is returned to the reactor 10 via the blower 14. The pressure of the system is controlled by the pressure control valve 15.

A process of continuous reaction according to the present invention will be described in more detail. The organic solvent, sulfur, and the catalyst are added in an appropriate amount into a stirred reactor and stirred. When the reaction temperature is reached, carbon monoxide is added to the solution or suspension or the gas phase to maintain the set pressure. The gas phase is fed into a condenser and cooled to a temperature where the formed carbonyl sulfide can be condensed. The gas phase above the condenser is connected to a blower which can fed the gas phase into the reactor. The air flow rate of the blower can be controlled to control the reaction rate for the production of carbonyl sulfide.

The blower is stopped at the beginning of the reaction to react the carbon monoxide, which results in increase in the concentration of the carbonyl sulfide in the solution or suspension. Eventually, absorption of the carbon monoxide stops. When the blower is activated to feed the gas phase from the condenser into the reactor, absorption of the carbon monoxide again occurs, and carbonyl sulfide is condensed. When the air flow rate is kept constant, and carbon monoxide is added to maintain the set pressure, the steady state is reached. In the step, sulfur is sequentially or continuously added into the reactor in an amount corresponding to the carbon monoxide consumption. If sulfur is continuously added, it is preferred to use molten sulfur.

Although the activity of the catalyst is not significantly reduced, optionally a minor amount of the catalyst may be further added to maintain the reaction rate. Although basically the organic solvent does not need to be exchanged or further added, the organic solvent may be optionally added to maintain liquid level in the reactor.

The reflux condenser located prior to the condenser is used to reflux the organic solvent, thereby substantially preventing loss of the organic solvent. The temperature of the condenser is set to a temperature higher than the boiling point of carbon monoxide at the system pressure and lower than the boiling point of carbonyl sulfide at the system pressure. When the system gauge pressure is 0.8 MPa, the temperature of the condenser is preferably in the range of from −60° C. to −10° C. The temperature of the reflux condenser is set to a temperature higher than the boiling point of carbonyl sulfide at the system pressure and lower than the boiling point of the organic solvent at the system pressure. When the system gauge pressure is 0.8 MPa, the temperature of the reflux condenser is preferably in the range of from 0° C. to 12° C.

Although the sulfur used in the present invention may have any form, the sulfur is sequentially or continuously added into the reactor in a powder form or a molten form. The added sulfur is dissolved in the organic solvent (the amount dissolved varies depending on temperature), and the dissolved sulfur reacts with carbon monoxide.

The reaction leads to condensation of carbonyl sulfide in a condenser to give a very high purity liquid carbonyl sulfide, which may be further purified by distillation to give a product.

Although the continuous reaction is the most efficient production process, one may employ the semibatch reaction in which the base catalyst, the organic solvent, and the reaction conditions according to the present invention are used, and sulfur is added into the reactor before only carbon monoxide is continuously added.

EXAMPLES

Now, the process for producing carbonyl sulfide of the present invention will be described with reference to the Examples, although the present invention is not limited thereto.

Example 1

1000 mL of dimethylformamide (DMF), 200 g of powder sulfur, 16 g of 1,8-diazabicyclo[5,4,0]-undec-7-ene (DBU) as a catalyst were added into the reactor of the apparatus illustrated in FIG. 1, stirred, and heated to 60° C. Carbon monoxide was continuously added into the resultant mixture with the reflux condenser kept at 11° C., the condenser kept at −15° C., and the blower at rest to maintain the system gauge pressure at 0.8 MPa. Eventually, absorption of the carbon monoxide stopped. When the blower was activated at an air flow rate of 2.0 NL/h, absorption of the carbon monoxide occurred, and carbonyl sulfide was condensed into the tank. Eventually, the steady state was reached, and the rate of carbon monoxide absorption became constant at 8.87 NL/h. When the air flow rate was increased to 10.4 NL/h after 2 hours, the rate of carbon monoxide absorption increased, and then the steady state was reached, when the rate of carbon monoxide absorption was 17.7 NL/h. When the air flow rate was increased to 33.6 NL/h, the rate of carbon monoxide absorption in the steady state increased to 26.6 NL/h, when the rate of carbonyl sulfide condensation was 71 g/h, achieving substantially constant conversion.

Example 2

1000 mL of toluene, 200 g of powder sulfur, and 26 g of 1,5,7-triazabicyclo[4.4.0]dec-5-ene (TBD) as a catalyst were added into the reactor of the apparatus illustrated in FIG. 1, stirred, and heated to 80° C. Carbon monoxide was continuously added into the resultant mixture with the reflux condenser kept at 11° C., the condenser kept at −15° C., and the blower at rest to maintain the system gauge pressure at 0.8 MPa. Eventually, absorption of the carbon monoxide stopped. When the blower was activated at an air flow rate of 7.6 NL/h, absorption of the carbon monoxide occurred, and carbonyl sulfide was condensed into the tank. Eventually, the steady state was reached, and the rate of carbon monoxide absorption became constant at 12.0 NL/h. When the air flow rate was increased to 24.1 NL/h after 2 hours, the rate of carbon monoxide absorption increased, and then the steady state was reached, when the rate of carbon monoxide absorption was 19.4 NL/h. When the air flow rate was further increased to 73.3 NL/h, then the rate of carbon monoxide absorption in the steady state increased to 25.3 NL/h, when the rate of carbonyl sulfide condensation was 67 g/h, achieving substantially constant conversion.

Example 3

1000 mL of dimethylformamide (DMF), 200 g of powder sulfur, 16 g of 1,8-diazabicyclo[5,4,0]-undec-7-ene (DBU) as a catalyst were added into the reactor of the apparatus illustrated in FIG. 1, stirred, and heated to 60° C. Carbon monoxide was continuously added into the resultant mixture with the reflux condenser kept at 11° C., the condenser kept at −15° C., and the blower at rest to maintain the system gauge pressure at 0.8 MPa. Eventually, absorption of the carbon monoxide stopped. When the blower was activated at an air flow rate of 33.6 NL/h, absorption of the carbon monoxide occurred, and carbonyl sulfide was condensed into the tank. Eventually, the steady state was reached, and the rate of carbon monoxide absorption became constant at 26.6 NL/h. After two hours, molten sulfur at 130° C. was continuously added into the reactor at a rate of 38 g/h to continue the reaction, thereby maintaining the rate of carbonyl sulfide condensation at 71 g/h.

INDUSTRIAL APPLICABILITY

The carbonyl sulfide produced by the process of the present invention can be suitably used as etching gas for highly anisotropically and highly selectively etching an organic antireflective coating by plasma.

REFERENCE SIGNS LIST 10 reactor
11 reflux condenser
12 condenser
13 tank
14 blower
15 pressure control valve
20 carbon monoxide feed line
21 sulfur feed line

The invention claimed is:

1. A process for producing carbonyl sulfide, the process comprising continuously adding carbon monoxide into a reactor which contains sulfur dissolved or suspended in an organic solvent in the presence of a base catalyst; reacting the sulfur with the carbon monoxide at a pressure of 0.2-3.0 MPa and a temperature of 40-120° C. to form carbonyl sulfide; recovering a gas phase from the reactor; cooling the recovered gas phase using a condenser to condense the carbonyl sulfide in the gas phase; continuously recovering the condensed carbonyl sulfide; and returning the uncondensed gas to the reactor to continuously produce carbonyl sulfide,
  wherein the base catalyst is a basic organic compound selected from the group consisting of amidine bases, guanidine bases, and phosphazene bases,
  wherein the amidine bases are selected from the group consisting of 1,8-diazabicyclo[5.4.0]undec-7-ene and 1,5-diazabicyclo[4.3.0]non-5-ene, the guanidine bases are selected from the group consisting of 1,5,7-triazabicyclo[4.4.0]dec-5-ene and 7-methyl-1,5,7-triazabicyclo[4.4.0]dec-5-ene, and the phosphazene bases are selected from the group consisting of alkylimino-tris(dimethylamino)phosphorane in which the alkyl is a $C_{1-8}$ alkyl group and alkylimino-tris(pyrrolidino)phosphorane in which the alkyl is a $C_{1-8}$ alkyl group.

2. The process for producing carbonyl sulfide according to claim 1, the process further comprising continuously adding sulfur into the reactor.

\* \* \* \* \*